US00RE37368B1

(19) United States
(12) Reissued Patent
Huppenthal et al.

(10) Patent Number: US RE37,368 E
(45) Date of Reissued Patent: Sep. 18, 2001

(54) HIGH DENSITY, HIGH BANDWIDTH, COAXIAL CABLE, FLEXIBLE CIRCUIT AND CIRCUIT BOARD CONNECTION ASSEMBLY

(75) Inventors: Jon M. Huppenthal, Colorado Springs, CO (US); Steven E. Garcia, League City, TX (US)

(73) Assignee: Medallion Technology, LLC, Houston, TX (US)

( * ) Notice: This patent is subject to a terminal disclaimer.

(21) Appl. No.: 09/064,536

(22) Filed: Apr. 22, 1998

Related U.S. Patent Documents

Reissue of:
(64) Patent No.: Re. 36,845
Issued: Aug. 29, 2000
Appl. No.: 08/910,716
Filed: Aug. 13, 1997

Which Is a Reissue of:
(64) Patent No.: 5,509,827
Issued: Apr. 23, 1996
Appl. No.: 08/342,850
Filed: Nov. 21, 1994

U.S. Applications:
(62) Division of application No. 08/910,716, filed on Aug. 13, 1997, now Pat. No. Re. 36,845.

(51) Int. Cl.[7] ..... H02G 15/02; H01R 9/05; H01R 9/07

(52) U.S. Cl. ..... 174/74 R; 174/78; 439/638; 439/581; 333/260

(58) Field of Search ..... 174/135, 78, 88 B, 174/102 R, 84 C, 88 R, 88 C; 439/579, 497, 581

(56) References Cited

U.S. PATENT DOCUMENTS 3,689,865 * 9/1972 Pierini et al. ..... 339/17 L
4,484,792 * 11/1984 Tengler et al. ..... 339/143 R
4,628,159 * 12/1986 Deitch et al. ..... 200/51.05

(List continued on next page.)

OTHER PUBLICATIONS

Ken Gilleo (Editor), Handbook of Flexible Circuits, pp. 42–68 (authored by Joe Fjelstand and Ken Gilleo), 1992.

Agard et al., Coaxial Cable To Printed Circuit Board Connector, IBM Tech. Discl. Bulletin, vol. 13, No. 6, p. 1595, Nov. 1970.*

*Primary Examiner*—Kristine Kincaid
*Assistant Examiner*—William H Mayo, III
(74) *Attorney, Agent, or Firm*—John R. Ley; L. Jon Lindsay; Roger J. Fulghum

(57) ABSTRACT

A connection assembly includes a coaxial cable to microstrip flexible circuit connector and a mating microstrip flex circuit to electronic circuit connector. The coaxial cable to microstrip flex circuit connector comprises a portion which is mechanically attached to the coaxial cable and a portion which is mechanically attached to the microstrip flex circuit. The coaxial cable attachment portion includes a first electrical connector electrically connected to the center conductor and a second electrical connector electrically connected to the shielding conductor of each coaxial cable. The microstrip flex circuit attachment portion includes a third electrical connector electrically connected to each trace and a fourth connector electrically connected to the ground plane conductor. The flex circuit to electrical circuit connector comprises a plurality of unsupported extensions of a trace or the ground plane conductor. The extensions are electrically connected to connection pads of a printed circuit board of an electronic circuit by a surface connection, and can be bent to opposite sides of the electronic circuit to reach connection pads on a printed circuit board.

20 Claims, 10 Drawing Sheets

U.S. PATENT DOCUMENTS

| | | | | |
|---|---|---|---|---|
| 4,708,666 | * | 11/1987 | Fisher, Jr. | 439/580 |
| 4,759,729 | * | 7/1988 | Kemppainen et al. | 439/580 |
| 4,995,815 | * | 2/1991 | Buchanan et al. | 333/260 |
| 5,194,020 | * | 3/1993 | Voltz | 439/579 |
| 5,346,403 | * | 9/1994 | Hyzin | 439/95 |
| 5,413,494 | * | 5/1995 | Dewey et al. | 439/188 |
| 5,415,567 | * | 5/1995 | Fusselmann et al. | 493/344 |
| 5,437,562 | * | 8/1995 | Michael | 439/581 |
| 5,441,419 | * | 8/1995 | Takazawa et al. | 439/86 |
| 5,453,026 | * | 9/1995 | Ikegami | 439/579 |
| 5,453,750 | * | 9/1995 | Battista et al. | 333/260 |
| 5,467,062 | * | 11/1995 | Burroughs | 333/124 |
| 5,469,130 | * | 11/1995 | Okada et al. | 333/260 X |
| 5,469,139 | | 11/1995 | Okada et al. | 333/246 |
| 5,632,634 | * | 5/1997 | Soes | 439/101 |
| 5,664,952 | | 9/1997 | Mockett et al. | 439/101 |

* cited by examiner

Fig.2
AMENDED
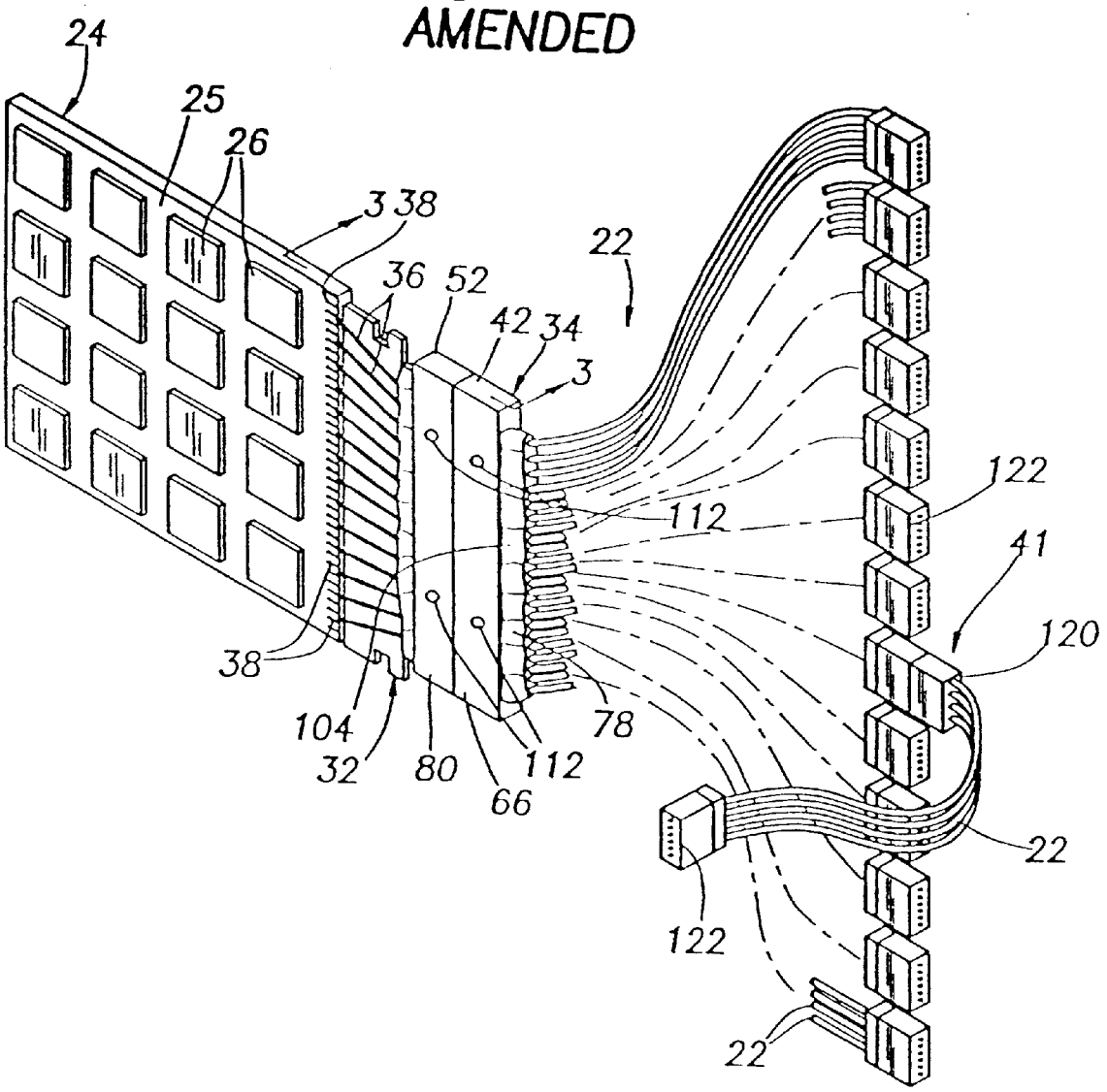

HIGH DENSITY, HIGH BANDWIDTH, COAXIAL CABLE, FLEXIBLE CIRCUIT AND CIRCUIT BOARD CONNECTION ASSEMBLY

Matter enclosed in heavy brackets [ ] appears in the original patent but forms no part of this reissue specification; matter printed in italics indicates the additions made by reissue.

*This reissue application is a division of and claims the benefit under 35 U.S.C. 120 of a pending prior reissue application having application Ser. No. 08/910,716, now U.S. Pat. No. Re. 36,845, which is a reissue of a parent application having the Ser. No. 08/342,850, now U.S. Pat. No. 5,509,827.*

The present invention relates generally to interconnecting coaxial cables, microstrip flexible circuits and electronic circuits, in a manner which consumes a relatively small amount of space, which does not materially degrade the frequency response or "bandwidth" of the high frequency signals which are transmitted to and from the electronic circuit, and which is convenient to manufacture and use. More particularly, the invention relates to new and improved connectors for interconnecting a relatively high number of coaxial cables to traces of the flexible circuit, for interconnecting a relatively large number of traces of a flexible circuit to the electronic circuit, and for interconnecting a relatively large number of coaxial cables.

BACKGROUND OF THE INVENTION

Transmitting very high frequency signals between physically separated circuits can be particularly difficult, because the higher frequency signals are susceptible to a variety of different adverse influences that do not affect lower frequency signals to an appreciable degree. In general, higher frequency signals carry more information per unit of time. The amount of information per unit of time is generally referred to as the "bandwidth" or information carrying capability of the signal. If the quality of the signal is degraded to the point where the informational characteristics of the signal can not be detected or decoded accurately, the bandwidth of the signal is reduced.

It is desirable to reduce or eliminate signal degradation as much as possible, because modern computer processors, logic circuits, controllers and other information processing electrical components of electronic circuits are usually capable of operating at frequencies which are higher than those frequencies which can be reliably conducted by conventional cables and conductors which interconnect physically separate circuits. The interconnecting conductors can therefore become a limitation on the bandwidth of the system as a whole. It is for this reason that it is important to maximize the bandwidth of the of electrical conductors which interconnect physically separate high frequency electronic circuits.

Coaxial cables and microstrip flexible circuits ("flex circuits") are frequently selected to connect the physically separated electronic circuits, because these types of electrical conductors offer advantages of maintaining a relatively high bandwidth. A coaxial cable has a shielding conductor which shields each individual signal carrying conductor from exterior radiated signals and noise. The shielding prevents the external noise from interfering with the desired signal. A flex circuit establishes a controlled impedance between the signal carrying conductor and a ground or reference plane. The signal shielding and controlled impedance are each very useful in maintaining the quality and integrity of the signal, thereby achieving a greater bandwidth.

Microstrip flex circuits are usually used to connect electronic circuits which are separated by only a short distance, usually less than a meter. Coaxial cables are usually employed to carry signals over greater distances. Microstrip flex circuits are not normally connected directly to coaxial cables. If a connection is made between a microstrip flex circuit and a coaxial cable, it is usually through an electronic circuit.

Even though a coaxial cable or a flex circuit may have enhanced signal carrying capabilities, those capabilities can be significantly degraded if the connection of the coaxial cable or the flex circuit to the electronic circuit is not adequate. A faulty connection to the circuit board can reduce or compromise the bandwidth of the high frequency signals just as much or more than a limited bandwidth resulting from the conductor itself.

The typical technique of connecting a coaxial cable to an electronic circuit is with a terminating connector. The terminating connector includes a center conductor to electrically connect a center conductor of the coaxial cable to the conductor traces of the circuit board. An exterior mechanical connector device, such as a threaded nut or a mechanical friction fit retaining device, electrically connects the shielding conductor to the ground reference of the electronic circuit and mechanically holds the coaxial cable in place. The threaded nut or friction fit retaining device occupies a relatively large amount of physical space at the edge of the electronic circuit, thereby limiting the number of connections which may be made in a given space.

In those situations where a relatively large number of coaxial cables must be connected to a circuit board of a relatively small size, the physical space requirements for mechanically connecting the coaxial cables may be greater than can be accommodated. In those cases, the shielding conductors of two or more coaxial cables are typically connected to a single mechanical device, thereby gaining some additional space. One typical approach to consolidate the shielding conductors has been to connect the shielding conductors of two adjacent coaxial cables and then insert the two connected shielding conductors in a ground plane receptacle. Another approach has been to solder a jumper wire to the connected shielding conductors and then insert single jumper into the ground plane receptacle. As a result, only three connections are required to interconnect two coaxial cables to an electronic circuit. The number of conductors or the "signal density" of connections is thereby raised.

The disadvantage of connecting the shielded conductors of two or more coaxial cables to the ground plane at a single solder connection or with a jumper is that the bandwidth of the coaxial cable is usually reduced as a result of this connection. The connection of the shielding conductors at the location where they are joined together creates relatively high inductances, resulting in signal path discontinuities, which reduces the bandwidth of the coaxial cable.

One of the disadvantages of connecting a multi-layer microstrip flex circuit to an electronic circuit board involves the connection of the inner ground plane conductor and the interior microstrip traces to the electronic circuit. The typical approach is to form individual connection pads on the exterior of the flex circuit and connect the connection pads to the interior ground plane and to the interior microstrip traces with plated through holes known as "vias." The vias route signals from the conductors inside the flex circuit to the outside connection pads. The vias and connection pads are then soldered to bonding pads of the electronic circuit.

To keep the impedance of the via to the connection pad controlled, each via must be very small in size, such as on the order of 0.005 inch. Making vias this small is very difficult. Consequently larger vias are typically employed, even though the larger vias typically introduce signal discontinuities and reduce the bandwidth of the signals conducted by the microstrip flex circuit.

It is with respect to these considerations and other background information that significant improvements in the field of interconnecting coaxial cables, microstrip flex circuits and electronic circuits have evolved.

SUMMARY OF THE INVENTION

One of the important aspects of a connection assembly of the present invention is a coaxial cable to microstrip flex circuit connector which achieves a relatively high number of electrical connections in a relatively small area, which achieves the connections in a manner which does not substantially reduce or compromise the bandwidth of the signals conducted through the conductor assembly, which allows selective connection and disconnection of the coaxial cables and the microstrip flex circuit, which can be constructed in a relatively convenient manner using many conventional printed circuit fabrication techniques, and which can be connected, disconnected and assembled in a relatively convenient manner.

In accordance with this aspect of the invention, the coaxial cable to microstrip flex circuit connector comprises a coaxial cable attachment portion which is mechanically attached to the coaxial cable and a microstrip flex circuit attachment portion which is mechanically attached to the microstrip flex circuit. The coaxial cable attachment portion includes a first electrical connector electrically connected to the center conductor and a second electrical connector electrically connected to the shielding conductor of each coaxial cable. The microstrip flex circuit attachment portion includes a third electrical connector electrically connected to each trace and a fourth connector electrically connected to the ground plane conductor. The coaxial cable attachment portion and the microstrip flex circuit attachment portion mate with one another to separately connect the first and third electrical connectors and the second and fourth electrical connectors.

The first and second electrical connections are preferably sockets and the third and fourth electrical connections are preferably inserts which fit within the sockets. A plurality of coaxial cables may be connected to the coaxial cable attachment portion, and a center conductor of each coaxial cable is connected to a first connector. The second electrical connectors are connected to at least one, and preferably a plurality of, shielding conductors. A grounding clip preferably connects to shielding conductors of a plurality of coaxial cables. The grounding clip preferably includes a projection portion connected to a second electrical connector, thereby achieving a plurality of ground connections through a single electrical connector. The third and fourth electrical connectors each preferably include a contact end of the insert which contacts traces, ground trace pads or exposed areas of the ground plane conductor of the microstrip flex circuit. Typically, the microstrip flex circuit includes traces formed on opposite sides of the ground plane conductor with a layer of insulation positioned between the traces and the ground plane conductor. The third and fourth electrical connectors are located in spaced apart rows and the microstrip flex circuit is positioned between the rows with the contact ends of the inserts contacting the traces, exposed areas and ground trace pads on both sides of the microstrip flex circuit.

Another important aspect of the connection assembly of the present invention is a microstrip flex circuit to electrical circuit connector which also achieves a relatively high density of electrical connections, which achieves the connections in a manner which does not substantially reduce or compromise the bandwidth of the signals conducted, and which can be constructed and assembled in a relatively convenient manner.

In accordance with this aspect of the invention, the microstrip flex circuit to electrical circuit connector comprises a plurality of unsupported extensions of the microstrip traces and the ground plane conductor extending from the microstrip flex circuit. Each extension is electrically surface connected to bonding pads of a printed circuit board of the electronic circuit. Typically the microstrip flex circuit includes traces formed on opposite sides of the ground plane conductor with a layer of insulation positioned between the traces and the ground plane conductor. The printed circuit board of the electronic circuit may typically include bonding pads formed on opposite sides of the printed circuit board. The microstrip flex circuit to electrical circuit connector allows an extension from one side of the flex circuit to bend and connect to a bonding pad adjacent to the other side of the flex circuit. The extensions from the ground plane conductor also bend to connect to the bonding pads on both sides of the printed circuit board. A potting compound or adhesive preferably establishes a mechanical connection of the microstrip flex circuit to the circuit board at the location of the extensions and the bonding pads.

A further important aspect of the connection assembly of the present invention is a coaxial cable to coaxial cable connector which also achieves a relatively high density of electrical connections, which achieves the connections in a manner in which does not substantially reduce or compromise the bandwidth of the signals conducted, and which can be constructed and assembled in a relatively convenient manner.

In accordance with this aspect of the invention, the coaxial cable to coaxial cable connector comprises first and second attachment portions which are similar to the coaxial cable attachment portion and the flex circuit attachment portion of the coaxial cable to flex circuit attachment portion. Grounding clips are employed in the first and second attachment portions to connect the shielding cables of the interconnected coaxial cables through the mated first and second attachment portions. First electrical connectors such as the sockets and second electrical connectors such as the inserts are retained in bodies of the first and second attachment portions. The first and third electrical connectors are connected to the center conductors of the coaxial cables, and the electrical connection between the attachment portions is achieved in the same manner as the coaxial cable to flex circuit connector.

A more complete appreciation of the present invention and the scope thereof can be obtained by reference to the accompanying drawings which are briefly summarized below, to the following detailed description of a presently preferred embodiment of the invention, and to the appended claims.

BRIEF DESCRIPTION OF THE DRAWINGS

FIG. 2 is an enlarged view of one small electronic circuit and of the connection assembly shown in FIG. 1, in which there is shown in greater detail, a plurality of coaxial cables, a coaxial cable to flexible circuit connector, a stripline or microstrip flexible circuit, a coaxial cable to coaxial cable connector, a microstrip flexible circuit to electronic circuit connector and a coaxial cable to coaxial cable connector.

DETAILED DESCRIPTION

Figure 1:
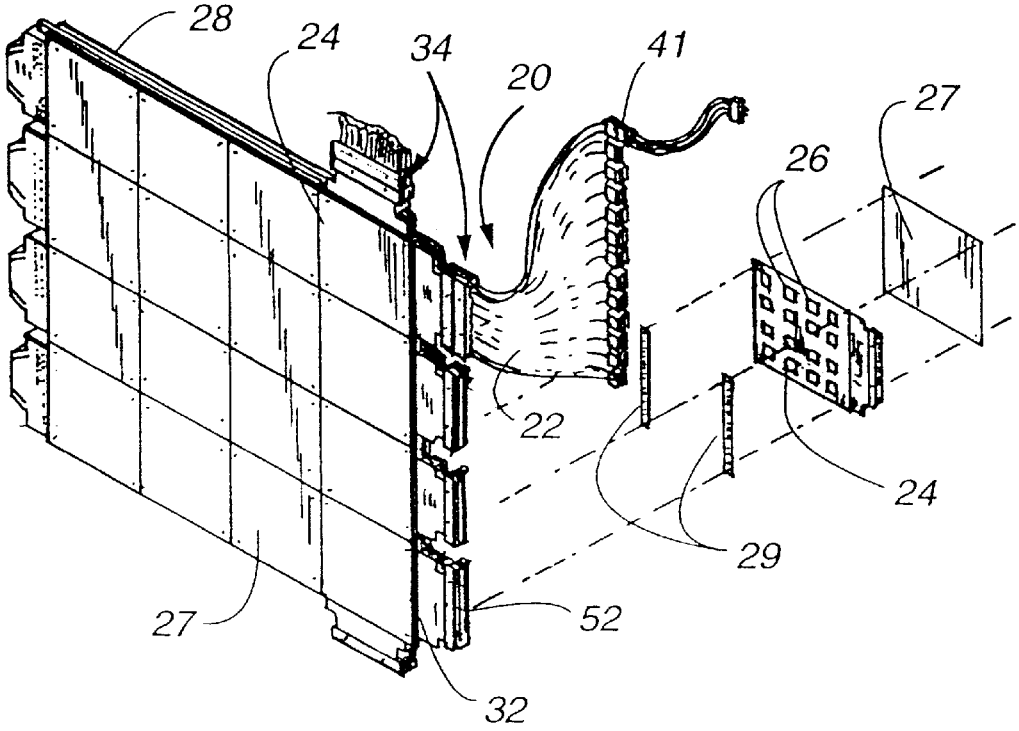
FIG. 1 is a perspective view of an electronic circuit board assembly formed by a plurality of small electronic circuits to which a connection assembly of the present invention is connected.

A connection assembly 20 which embodies the present invention is shown in FIGS. 1 and 2. The connection assembly 20 connects a plurality of conventional coaxial cables 22 to an electronic circuit 24. The electronic circuit 24 is preferably capable of transmitting and receiving signals over the connection assembly 20 at relatively high frequencies. The electronic circuit 24 will typically be constructed in the conventional manner, on a printed circuit board 25 to which a number of electronic components such as semiconductor dies or chips 26 are attached and interconnected by conventional conductive printed circuit board ("PCB") traces (not shown).

The connection assembly 20 of the present invention is illustrated in FIGS. 1 and 2 in use with electronic circuits 24 of the type used by the assignee hereof on its supercomputers. More details concerning these electronic circuits are found in the assignee's U.S. Pat. Nos. 5,054,192; 5,014,419; 5,045,975; and 5,195,237, among others. The electronic circuits 24 are approximately one inch square, and sixteen chips 26 are connected on one or both sides of the circuit board 25. A cover 27 covers the chips 26 on each side of the electronic circuit 24 to establish cooling channels through which a dielectric insulating cooling fluid flows. The electronic circuits 24 are spaced from a larger circuit retaining board 28 by spacers 29, also to establish a cooling path between the chips and the retaining board 28, as is discussed in the assignee's U.S. Pat. No. 5,260,850. The coaxial cables 22 used with the assignee's circuits are micro-coaxial cables.

Although the connection assembly 20 offers significant advantages in communicating high frequency signals in a supercomputer, it is not specifically required that it be employed for that purpose. The present invention can be employed in a wide variety of electrical connection situations and environments, including those where the coaxial cables are of the standard size and the frequency of the signals is not regarded as high.

Figure 4:
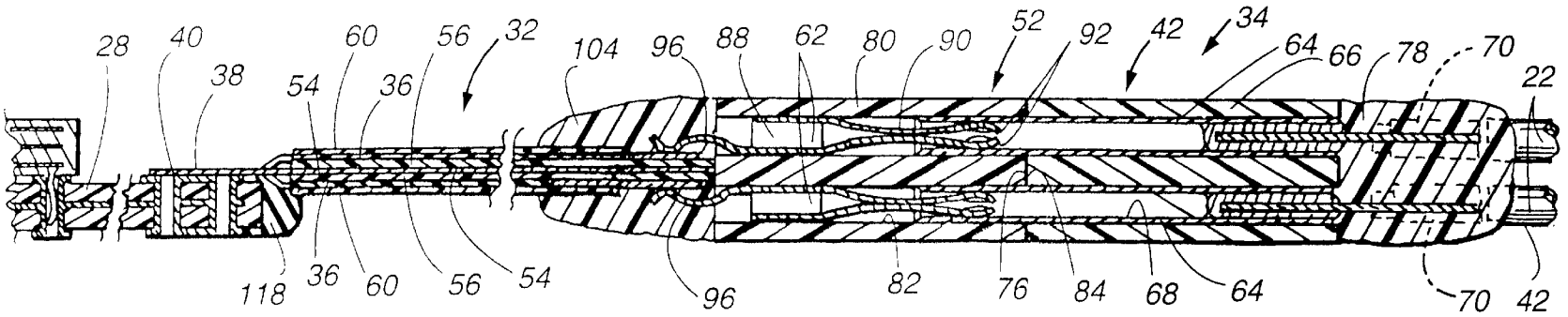
FIG. 4 is a section view taken substantially in the plane of line 4—4 in FIG. 3.
Figure 3:
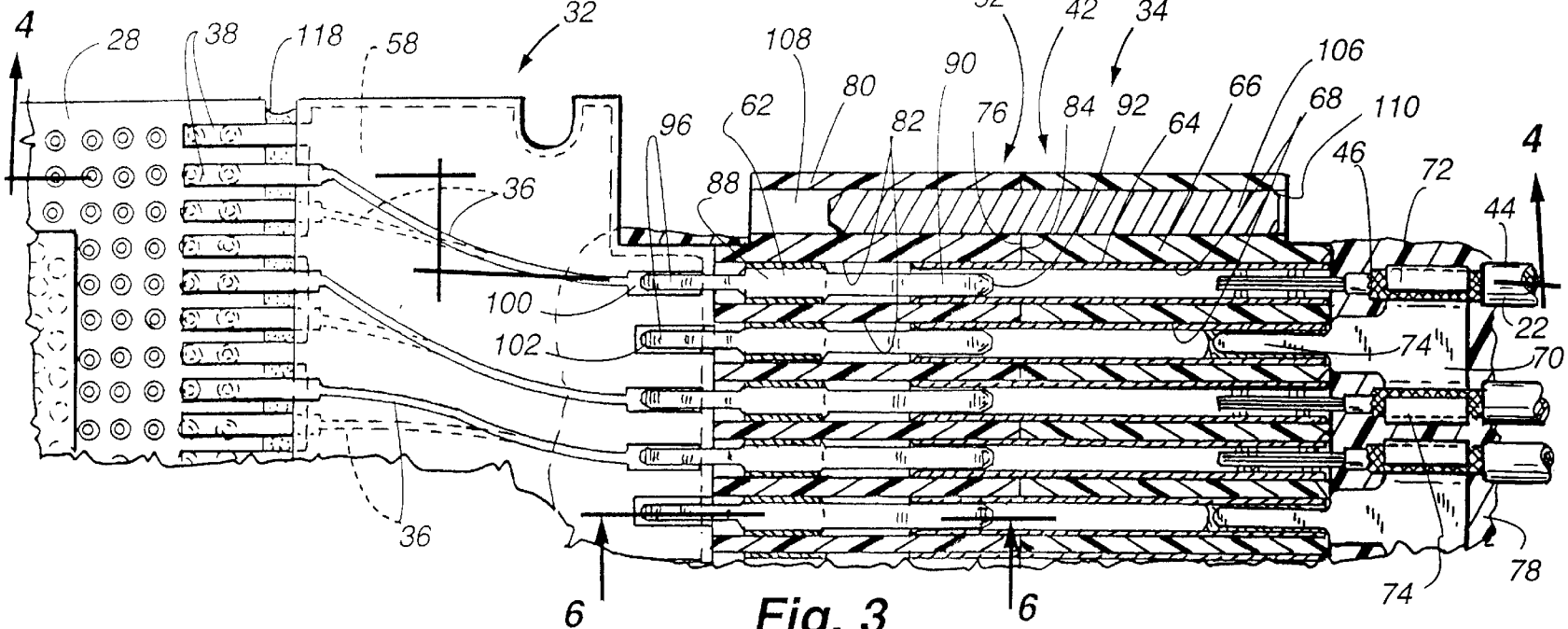
FIG. 3 is an enlarged and partial section view of the coaxial cable to microstrip flex circuit connector shown in FIG. 2, taken substantially in the plane of line 3—3.

The connection assembly 20 includes a conventional stripline or microstrip flexible circuit 32 which is connected to the coaxial cables 22 by a coaxial cable to microstrip flexible circuit connector 34 referred to herein as a "coax to flex connector 34". The stripline or microstrip flex circuit ("flex circuit") 32 includes a plurality of parallel-extending, conventional microstrips or traces 36 which carry individual signals between ends of the flex circuit 32, as are also shown in FIGS. 3 and 4. Extensions 38 of the flex traces 36 are connected to bonding pads 40 (FIG. 9) on the printed circuit board 28. The bonding pads 40 are formed as integral parts of PCB traces on the electronic circuit 24.

The new and improved features of the connection assembly 20 reside in the coax to flex connector 34, in the connection of the flex circuit 32 to the electronic circuit 24 by the extensions 38 and pads 40, and in a coaxial cable to coaxial cable connector 41 referred to below as a "coax to coax" connector 41. The coax to coax connector 41 is used to connect segments or lengths of coaxial cables 22.

Details concerning the coax to flex connector 34 are shown in FIGS. 3–7. The coax to flex connector 34 includes a first or coaxial cable attachment portion 42 to which the coaxial cables 22 are mechanically and electrically connected. The portion 42 of the connector 34 is referred to herein as a "coax attachment portion" 42. The coax attachment portion 42 receives and connects to the plurality of coaxial cables 22. All of the coaxial cables 22 have the same basic conventional configuration, shown in FIG. 7. An outer electrical insulating cover 44 surrounds a shielding conductor 46, which is shown as a braid. The shielding conductor 46 surrounds and encircles insulation 48 formed in the shape of annular tube. The insulation 48 surrounds a center conductor 50. The center conductor 50 carries the signals while the shielding conductor 46 prevents or inhibits the influence of radiated signals, both from external sources and from the center conductor 50.

The coax to flex connector 34 includes a second or microstrip flexible circuit attachment portion 52 to which the flex circuit 32 is mechanically and electrically connected. The portion 52 of the connector 34 is referred to below as a "flex attachment portion" 52. The flex circuit 32, to which the flex attachment portion 52 is connected, is of a conventional construction as shown in FIGS. 4–6, 8 and 9.

The flex circuit 32 includes a center, sheet-like ground plane conductor 54 which extends the width of the microstrip flex circuit 32. Uniform thickness and controlled impedance electrical insulation layers 56 are attached to the opposite planar surfaces of the ground plane conductor 54. The flex traces 36 are attached to the exterior surfaces of the insulating layers 56. The exterior of the flex traces 36 and the space between the flex traces is occupied by an exterior insulation layer 60.

The flex attachment portion 52 of the connector 34 is adapted to mate with the coax attachment portion 42 of the connector 34. When the coax and flex attachment portions 42 and 52 are mated together, signals are conducted between the center conductor 50 of the coaxial cable 22 and individual flex traces 36 of the flex circuit 32. An electrical connection between the shielding conductor 46 of the coaxial cable 22 and the ground plane conductor 54 of the flex circuit 32 is also established. In general, the electrical connections through the mated coax and flex attachment portions 42 and 52 are established by inserts 62 of the flex attachment portion 52 and sockets 64 of the coax attachment portion 42 which connect with one another.

Details of the coax attachment portion 42 are shown in FIGS. 4–6 and 7. The coax attachment portion 42 includes a block-like insulating body 66 into which a number of cylindrical holes 68 are formed. The body 66 is preferably formed of plastic, but other electrical insulating materials are suitable. The holes 68 are arranged in rows, and preferably in a plurality of rows (two are illustrated). The sockets 64 fit within the holes 68 when the flex and coax attachment portions 52 and 42 are mated. The sockets 64 are metallic conductive tubes, preferably a copper-beryllium alloy. By proper selection of the type of plastic or other insulating material used for the body 66 and the spacing of the holes 68, a controlled impedance path through the body 64 is achieved.

Figure 7:
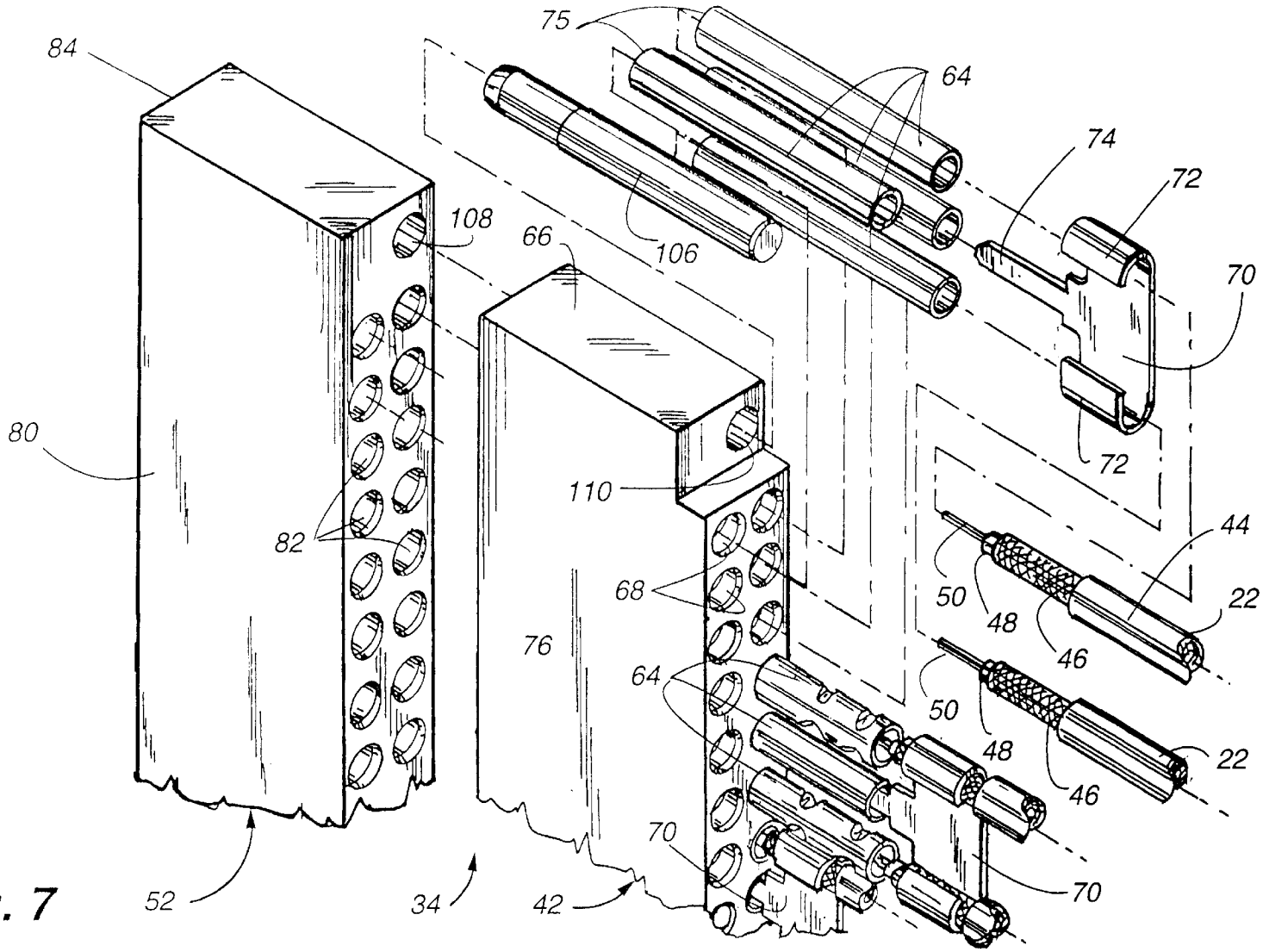
FIG. 7 is an enlarged, partial, perspective and exploded view of a coaxial cable attachment portion and a portion of a microstrip flexible circuit attachment portion of the coaxial cable to flex circuit connector portion of the connection assembly shown in FIG. 2.

The shielding conductors 46 of two coaxial cables adjacent one another in each row are commonly connected by a grounding clip 70, which is shown in FIG. 7. The grounding clip 70 is preferably stamped from sheet copper to provide a low inductance ground path at relatively high signalling frequencies. The grounding clip 70 includes two wing portions 72 and a projection portion 74. The projection portion 74 extends generally from the location where the two wing portions 72 join on the clip 70. Each wing portion 72 is bent or crimped to surround and contact the shielding conductor 46 of the two adjacent coaxial cables 22. Each wing portion 72 retains a coaxial cable in a location aligned with the first and third holes 68 of three adjacent holes 68 in a row on the body 66. The projection portion 74 of the grounding clip 70 extends generally in alignment with the two retained coaxial cables, at a position to extend into the middle one of the three adjacent holes 68 in the row of holes formed in the body 66.

One socket 64 is electrically and mechanically connected to the center conductor 50 of each coaxial cable 22 and to the projection portion 74 of the grounding clip 70, preferably by crimping an end of the socket 64 around the conductors 50 and projection portion 74, or by soldering. The outer cover 44, shielding conductor 46, inner insulation 48 and center conductor 50 are all stripped in a stepped configuration as shown to accommodate this connection. The end of the outer cover 44 preferably contacts or is closely adjacent to the wing portions 72 at the location where they are bent around the shielding conductor. The inner insulation 48 is preferably adjacent to the socket 64 in the final assembled form.

Figure 5:
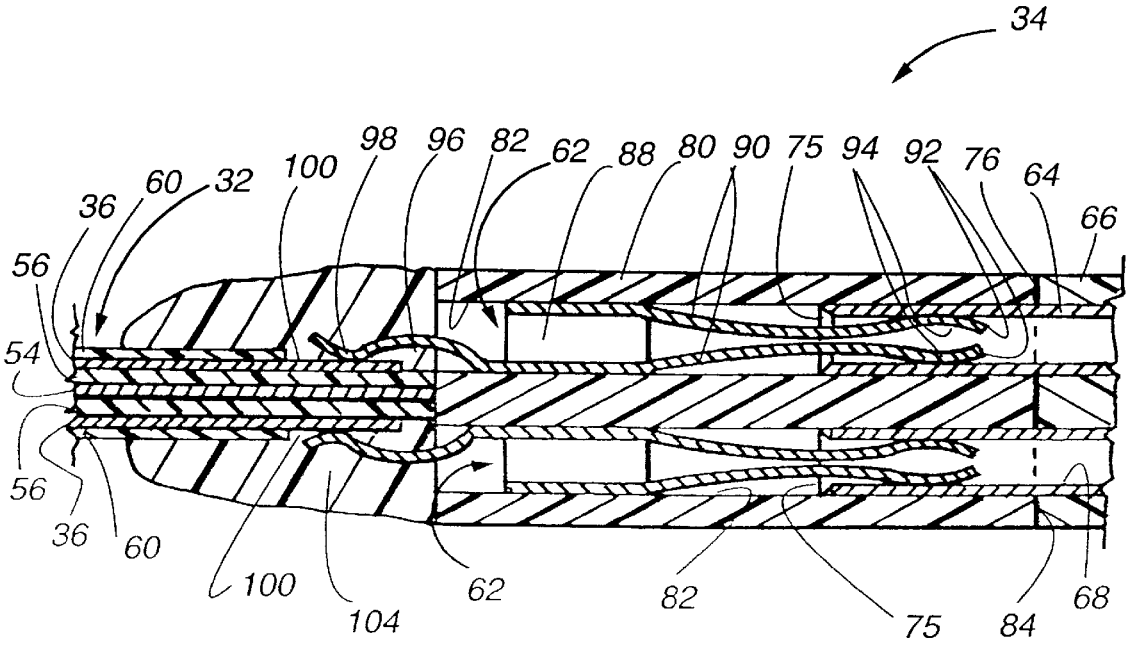
FIG. 5 is a further enlarged partial section view of a portion of FIG. 4.
Figure 6:
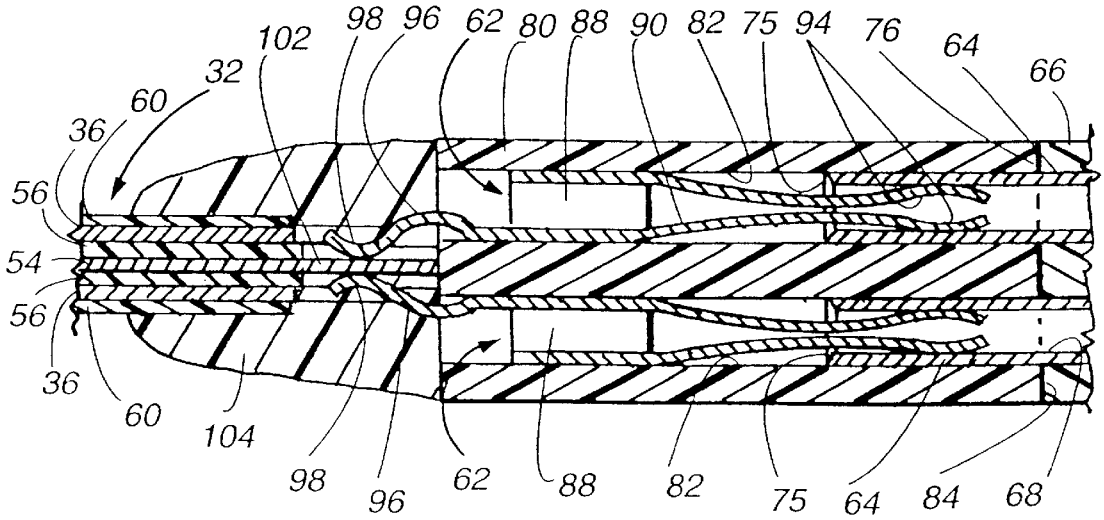
FIG. 6 is a view similar to FIG. 5 taken substantially in the plane of line 6—6 in FIG. 3.

After crimping the sockets 64 on the conductors 50 and projection portion 74 of the grounding clip 70, the sockets 64 are inserted into the holes 68 until ends 75 of the sockets 64 project a predetermined distance beyond a mating contact surface 76 of the body 66, as shown in FIGS. 5 and 6. The sockets 64 are held in the holes 68 by a suitable adhesive or by the resilient forces developed by the compression of the sockets 64 as they are inserted in slightly undersized holes 68. The contact surface 76 is adapted to contact a complementary mating contact surface 84 of a body 80 of the flex attachment portion 52 of the connector 34.

The bent wing portions 72, which are bent into contact with the shielding portions 44 of the two coaxial cables 22, hold the coaxial cables in position in alignment with one another and with the holes 68 and the sockets 64. The crimped connections also help maintain the position of the sockets 64 in the holes 68 and a mechanical connection of the coaxial cables 22 to the coax attachment portion 42.

Additional assemblies of two coaxial cables connected by a grounding clip 70 with attached sockets 64 are inserted into the other groups or sequences of three adjacent holes 68 in each row of holes, until all of the remaining holes in the body 66 are filled. To complete the mechanical attachment of the coaxial cables 22 to the coax attachment portion 42, an epoxy potting compound 78 (FIG. 4) is placed around the exposed portion of the grounding clip 70 and the coaxial cables. Once cured, the potting material 78 holds all of the elements in place on the body 66 to complete the coax attachment portion 42 of the connector 34.

The coax attachment portion 42 of the connector 34 achieves numerous improvements. The grounding clips 70 are a relatively small size, which allows the coaxial cables 22 to be placed relatively closely together. The contact of the wing portion 72 with the shielding conductor 46 does not consume substantially greater space than is consumed by the exterior cover 44 of the coaxial cable 22. More coaxial cables 22 can be placed at relatively closer locations along the body 66 than would be possible if exterior connection nuts or other space consuming devices were used to connect the shielding conductors 46. In addition, each grounding clip 70 provides a ground electrical connection for two coaxial cables 22, thus eliminating one of the exterior ground connections typically required for each coaxial cable. As a result three connectors are adequate to provide a high bandwidth connection for two coaxial cables. By eliminating one of the connectors for each two coaxial cables through use of the grounding clip 70, which consumes no more space than the exterior of the coaxial cable itself, a higher density of coaxial cables may be connected in a smaller amount of space.

The flex attachment portion 52 of the connector 34 is shown FIGS. 2–8. The flex attachment portion 52 includes a block-like insulating body 80 into which a number of cylindrical holes 82 are formed. The holes 82 are arranged at locations adapted to be coaxial with the centerline of the sockets 64 of the coax attachment portion 42. Consequently, the number of holes 82, the number of rows of holes 82 and the location of the holes 82 correspond to the number, rows and locations of the holes 68 in the body 66 of the coax attachment portion 42. The diameter of the holes 82 is slightly larger than the outside diameter of the sockets 64, to comfortably receive the projecting ends 75 of the sockets 64 when the coax and flex attachment portions 42 and 52 are connected. When connected, the mating surface 76 of the coax attachment portion 42 abuts a mating surface 84 of the flex attachment portion 52, as is shown in FIGS. 5 and 6.

Figure 8:
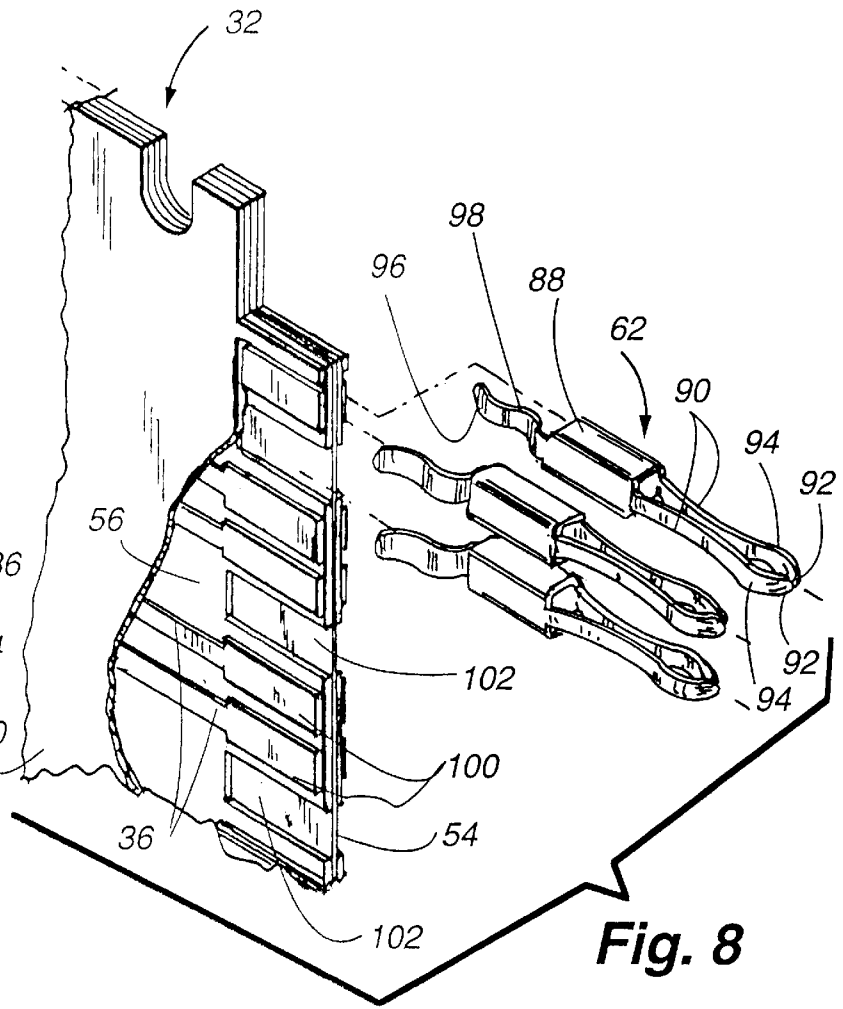
FIG. 8 is an enlarged, partial, perspective and exploded view of the remaining portion of the microstrip flexible circuit attachment portion not shown in FIG. 7.

One insert 62 is positioned in each of the holes 82. Details of each insert 62 are best shown in FIGS. 5, 6 and 8. Each insert 62 is initially stamped from a conductive sheet material such as copper-beryllium alloy and is then bent into the shape shown in FIG. 8. Each insert 62 includes a hollow body portion 88 from which fingers 90 project. The fingers 90 are attached on opposite sides of the body portion 88 and are curved to assume a mirror image configuration with respect to one another. A projecting end 92 of each of the fingers 90 is more closely positioned to the opposite finger 90 than an intermediate portion 94 of the fingers 90 between the end 90 and the body 88. The two fingers 90 therefore assume a shape similar to tongs or tweezers.

A single contact 96 projects in the opposite direction from the body 88 compared to the direction of projection of the fingers 90. The contact 96 extends generally in alignment with one of the fingers 90. The contact 96 is bent in somewhat of an S-shape as shown in FIGS. 5 and 6 and has an inner surface 98 adapted to contact an exposed end 100 of a microstrip trace 36 or an exposed area 102 of the ground plane conductor 54 of the flex circuit 32.

The fingers 90 and the S-shaped contact 96 both have spring characteristics which allow them to create resilient force when deflected. The force from deflection of the contact 96 causes the region 98 to press firmly against the end 100 of the microstrip trace 36 (FIG. 5) or to press firmly against the exposed area 102 of the ground plane conductor 54 (FIG. 6) to establish good contact. The contacts 96 are then preferably soldered to the ends 100 of the traces 36 and to the exposed areas 102 of the ground plane conductor 54 at the regions 98. Similarly, force from the inward deflection of the fingers 90 toward one another as they are inserted into the socket 64 causes force from intermediate regions 94 of both fingers to establish a good electrical contact with the interior wall of the socket 64, as is shown in FIGS. 5 and 6.

The inserts 62 are positioned in the holes 82 at a location where the projecting ends 92 of the fingers 90 are recessed in the holes 82 from the mating surface 84, as shown in FIGS. 3–6. In this position, the fingers 90 will not project beyond the body 80 to avoid unintentional contact and damage when the flex attachment portion 52 is not connected to the coax attachment portion 42. However, even in this recessed position, the fingers 90 adequately project into the sockets 64 to establish good electrical contact when the mating surfaces 76 and 84 contact one another upon connection of the portions 42 and 52 of the connector 34. The projecting ends 75 of the sockets 64 extend into the holes 82 to align the coax and flex attachment portions before they are mated together. Because the sockets 62 offer more strength, there is less risk of accidental damage of them as a result of their projection from the body 66 of the attachment portion 42. As the coax and flex attachment portions mate together, the projecting ends 92 move easily into the interior of the sockets 64 at the end 75, and further movement resiliently compresses the fingers 90 within the interior of the socket.

The position of the inserts 62 in the holes 82 of the body 80 causes the S-shaped contacts 96 to extend almost entirely from the holes 82. The inserts 62 are maintained in position by an adhesive, or by frictional contact of the body portion 88 with the round holes 82. In this position, the contacts 96 contact the connection pads 100 formed at the ends of the microstrip traces 36, and the contacts 96 also contact the exposed areas 102 of the ground plane conductor 54, when the microstrip flex circuit 32 is inserted between the two rows of S-shaped contacts (FIG. 4).

To expose the connection pads 100 of the traces 36, the outer insulation layer 60 is removed from the flex traces 36 in those locations of the pads 100 where the intermediate regions 98 of the contacts 96 make contact, as shown in FIGS. 5 and 8. The outer insulation 60 and the inner insulation layer 56 are both removed from the flex circuit 32 in those exposed areas 102 where the intermediate regions 98 of the contacts 96 make contact with the ground plane conductor 54, as shown in FIGS. 6 and 8.

The flex circuit 32 is maintained in connection with the flex attachment portion 52 by soldering the finger regions 98 and covering them with epoxy potting compound 104. The cured epoxy potting compound 104 also assists in maintaining the inserts 62 in position in the flex connector portion 52. By proper selection of the type of plastic or other insulating material used for the body 80 and the spacing of the holes 82, a controlled impedance path through the connector body 80 is achieved.

In this manner, the coax to flex connector 34 establishes an electrically conductive signal path between the inner signal-carrying conductors 50 of the coaxial cables 22 and the flex traces 36 of the flex circuit 32, through the inserts 62 and the sockets 64. A conductive path between the ground plane conductor 54 of the flex circuit 32 and the shielding conductor 46 of each coaxial cable 22 is also established through the inserts 62, the sockets 64 and the grounding clips 70.

As can be appreciated from FIG. 7, those sockets 64 which are connected to the projection portion 74 of the grounding clips 70 are located at every third position in a sequence of holes 68 in each row. The insulation layers 56 and 60 of the flex circuit must be removed to expose the areas 102 of the ground plane conductor 54 in locations which align with every third hole 68, as is shown in FIG. 8. In this manner, the contacts 96 of the inserts 62 which mate with the sockets 64 connected to the grounding clips 70 will contact the exposed areas 102. Since a microstrip flex circuit 32 is formed in a manner generally similar to the manner of formation of a printed circuit board, the location of the traces 36, the location of the exposed areas 102 of the ground plane conductor 54, and the size of the flex circuit is readily fabricated to meet these requirements.

To align the attachment portions 42 and 52 of the coax to flex connector 34 before connecting them together, it is advantageous to incorporate an alignment pin 106 and alignment holes 108 and 110 in the bodies 66 and 80 of the attachment portions 42 and 52, respectively, as shown in FIGS. 3, and 7. The alignment pin 106 is preferably permanently retained in hole 110 of the body 66 by an adhesive or by press fitting the shank of the pin 106 into a slightly undersized hole. A similar alignment pin 106 and alignment hole 108 are located on the opposite side of the connector 34. The alignment pins and holes assure that the sockets 64 will fit within the holes 82 when the attachment portions 42 and 52 are mated together.

Tooling holes 112 are another feature of the coax to flex connector 34, as shown in FIG. 2. The tooling holes 112 are formed in the bodies 66 and 80 at an exterior side which extends at an angle to the mating surfaces 76 and 84. A tool (not shown) may be inserted into the holes 112 to apply force to the attachment portions 42 and 52 for either separating them or mating them. The holes 112 are slightly tapered in an inward direction to assist in inserting and removing the tool. The holes 112 allow one tool to be used for both separating and mating the attachment portions 42 and 52. This is an advantage compared to some types of connectors which require one type of tool to separate the connector portions and a different tool to join the connector portions. The holes 112 may be formed completely through the bodies 66 and 80 at locations which do not interfere with the electrical conductors, or they may be formed partially into the bodies 66 and 80 from an exterior location and on one or both sides of the bodies.

In addition the separating and mating functionality facilitated by the holes 112, the holes 112 may also be formed with sufficient precision in size and location to be useful as fixturing points during mechanical assembly of each attachment portion 42 and 52, during testing of the connector 34 and each attachment portion 42 and 52. Furthermore, the holes 112 can be used to accommodate a clamping frame whose purpose is mate and disconnect several connectors 34 simultaneously. The holes 112 can also be used for retaining the connector 34 to some type of exterior structure.

Figure 10:
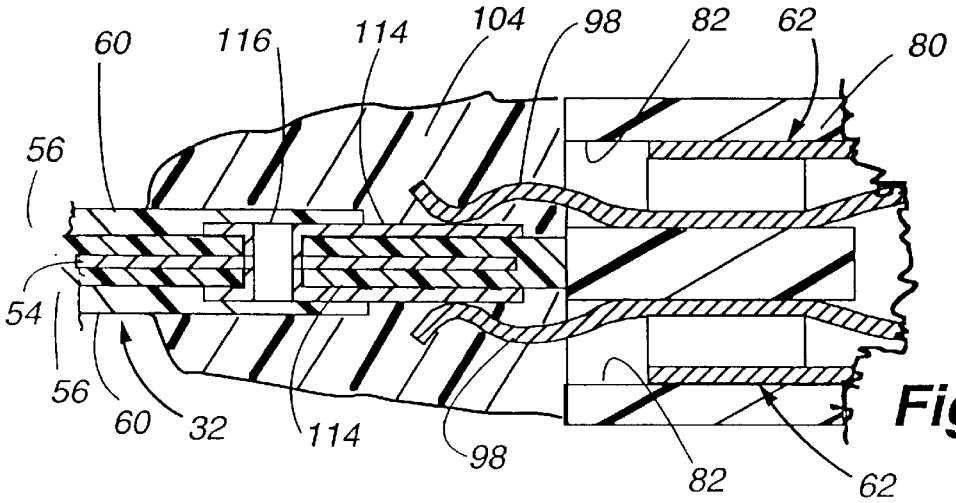
FIGS. 10, 11 and 12 are partial views of an alternative embodiment of the microstrip flexible circuit to electronic circuit connector similar to those views shown in FIGS. 3, 4 and 9, respectively.
Figure 11:
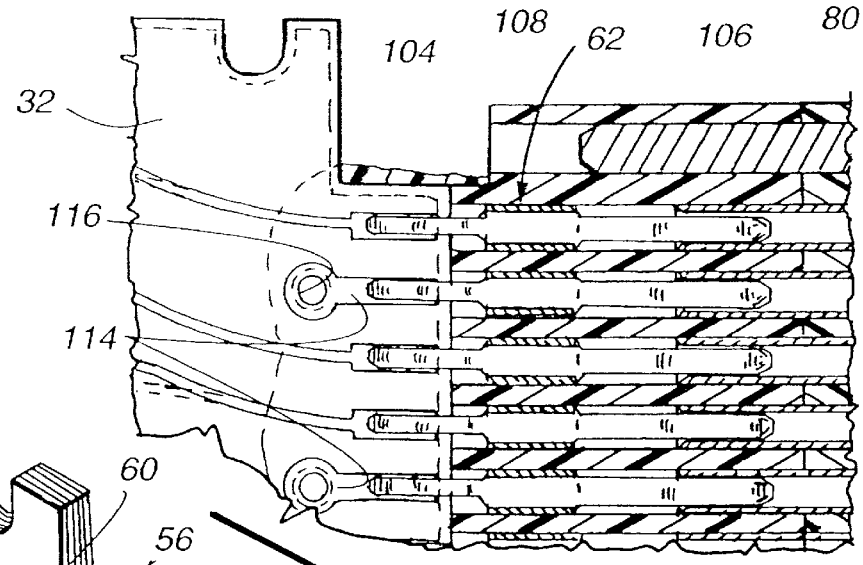
Figure 12:
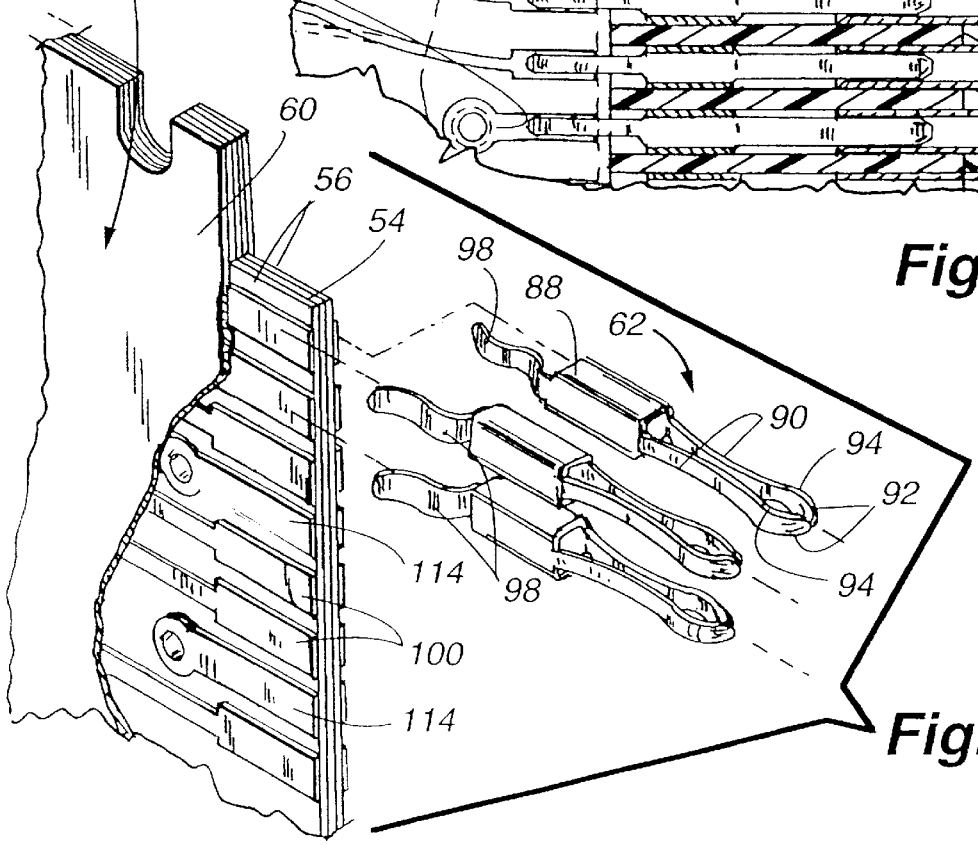

An alternative approach of connecting the flex circuit 32 to the attachment portion 52 is shown in FIGS. 10–12. In this alternative embodiment, the ground plane conductor 54 is not exposed at the areas 102 as described above. Instead, separate ground trace pads 114 are formed on the insulation layers 56 in the same plane and adjacent to the connection pads 100 of the traces 36. The ground trace pads 114 are connected to the ground plane conductor 54 by conventional plated through holes or vias 116. Each via 116 extends through the insulation layers 56 and through holes formed in the ground plane conductor 54 and the ground trace pads 114. The plating which forms each via 116 electrically connects to the edges of the ground plane conductor 54 and the ground trace pads 116 at the location of the hole in which the via 116 is located.

The ground trace pads 114 are similar in construction to the connection pads 100 of the flex traces 36. The vias 116 are formed in the area of the ground trace pads 114 at a location slightly beyond the ends of the contacts 96. As is shown in FIG. 10, the ground trace pads are located on opposite sides of the flex circuit 32 to allow a single via 116 to extend through the flex circuit and connect two ground trace pads 114 on opposite sides of the ground plane conductor 54. Thus, each insert 62 which mates with a socket 64 that is connected to a grounding clip 70 is electrically connected to the ground plane conductor 54.

The force from deflection of the contact 96 causes the region 98 to press firmly against the ground trace pad 114 to establish good electrical contact, in the same manner that the force from deflection of the contact 96 causes a good electrical contact with the connection pads 100 of the traces 36. It is desirable to have the ground path connections be of an impedance as low as possible, to avoid signal distortions. The vias 116 can be made large and therefore relatively easy to fabricate. In other situations, the vias would have to be made relatively small to obtain impedance matching.

Figure 9:
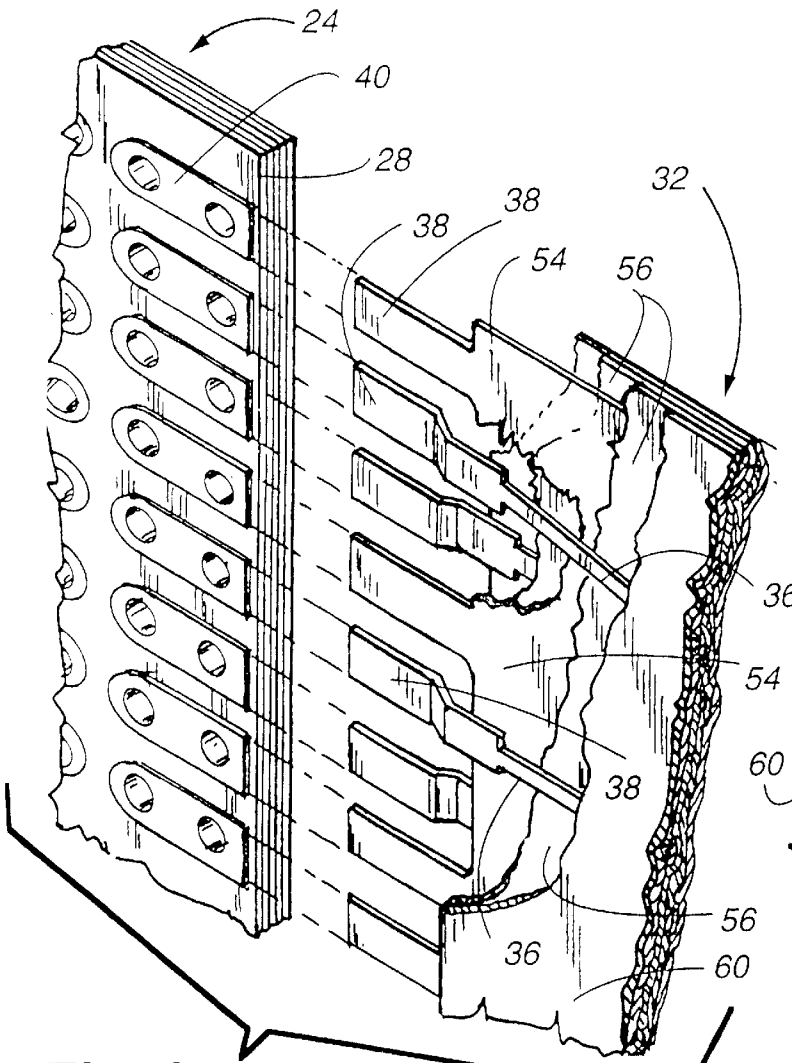
FIG. 9 is an enlarged, partial, perspective and exploded view of the microstrip flexible circuit to electronic circuit connector shown in FIG. 2.

Details concerning the connection of the microstrip flex circuit 32 to the electronic circuit 24 are shown in FIGS. 3, 4 and 9. In general, the extensions 38 of the flex traces 36 and similar extensions 38 of the ground plane conductor 54 extend from the flex circuit 32. The extensions are unsupported by the other portions of the flex circuit 32 as a result of removing and eliminating the insulation layers 56 and 60, the traces 36 and the ground plane conductor 54 surrounding the extensions 38. The unsupported extensions 38 are connected, preferably by a reflow solder technique, to the flat bonding pads 40 located along an edge of the circuit board 28.

Because the extensions 38 are not supported at the end of the flex circuit 32, the extensions 38 can contact the pads 40 on one or both sides of the circuit board 26. FIG. 9 illustrates three adjoining extensions 38 on the upper surface (as shown) of the flex circuit 32 connected to bonding pads 40 on the same upper surface of the circuit board 28. As is also illustrated in FIGS. 4 and 9, the extensions 38 from the traces 36 on both sides of the ground plane conductor 54 may be bent in an offset manner to lie in a single plane. Thus the extensions 38 may be bent to accommodate attachment to the bonding pads on either side of a circuit board or at any planar location along the thickness (shown in FIG. 4) of the flex circuit 32. To create structural strength at the connection of the flex circuit 32 to circuit board 28 of the electronic circuit 24, a bead of structural potting compound 118 such as epoxy is added to connect the circuit board and the flex circuit.

A relatively large sized face to face solder connection of the extensions 38 to the bonding pads 40 creates a surface mount connection with a very high bandwidth and impedance control. A very high density of circuit connections is achieved by this technique, because of the relatively close spacings between adjoining extensions 38 and adjoining pads 40 and 100. The use of unsupported leads in the surface soldering connection eliminates the difficult prior art technique of blind soldering surface pads of the flex circuit 32 which are connected by small vias to traces 36.

Figure 13:
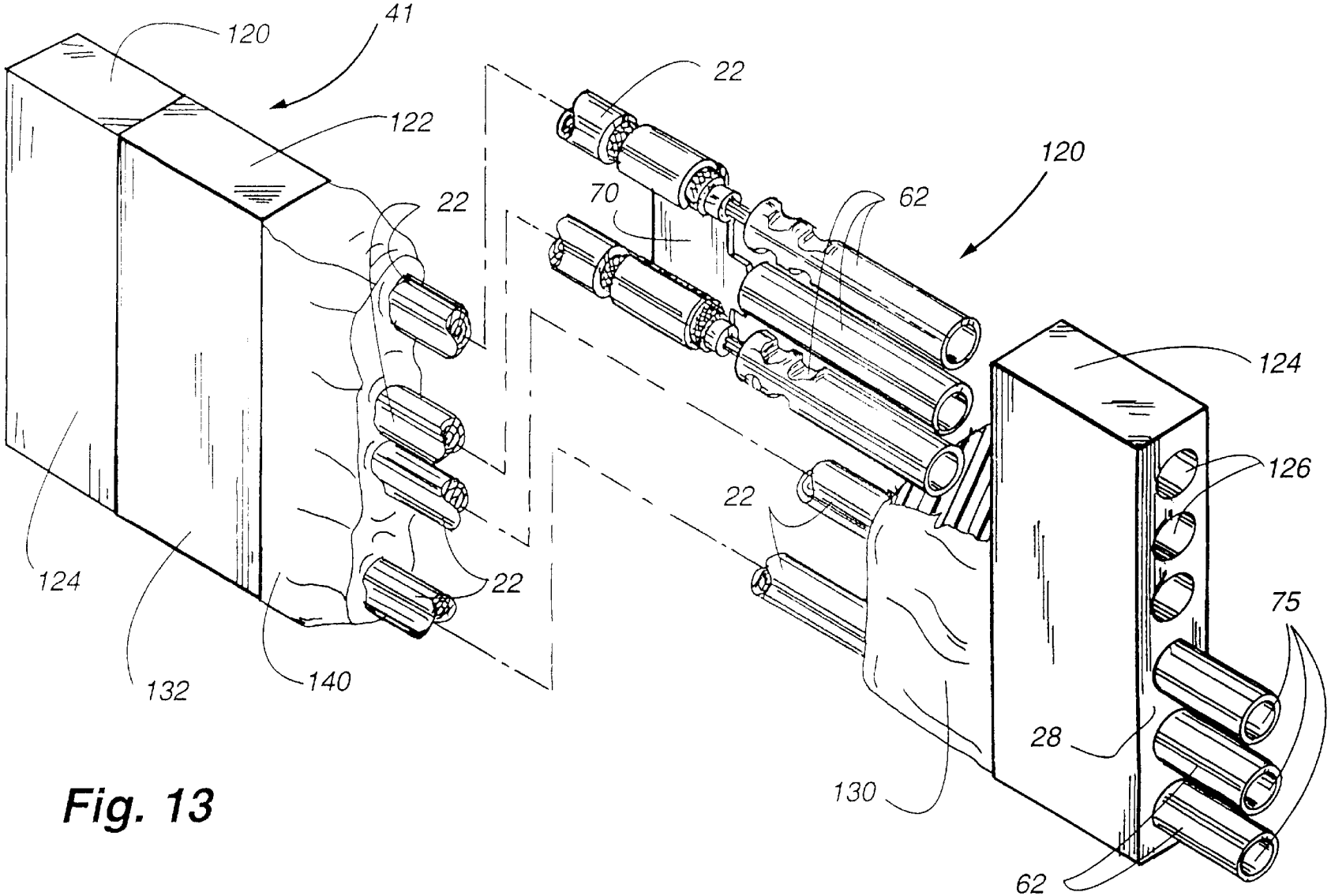
FIG. 13 is an enlarged, partial, perspective and exploded view of a coaxial cable to coaxial cable connector of the connection assembly shown in FIG. 2 and of a socket retaining portion of the coaxial cable to coaxial cable connector.
Figure 14:
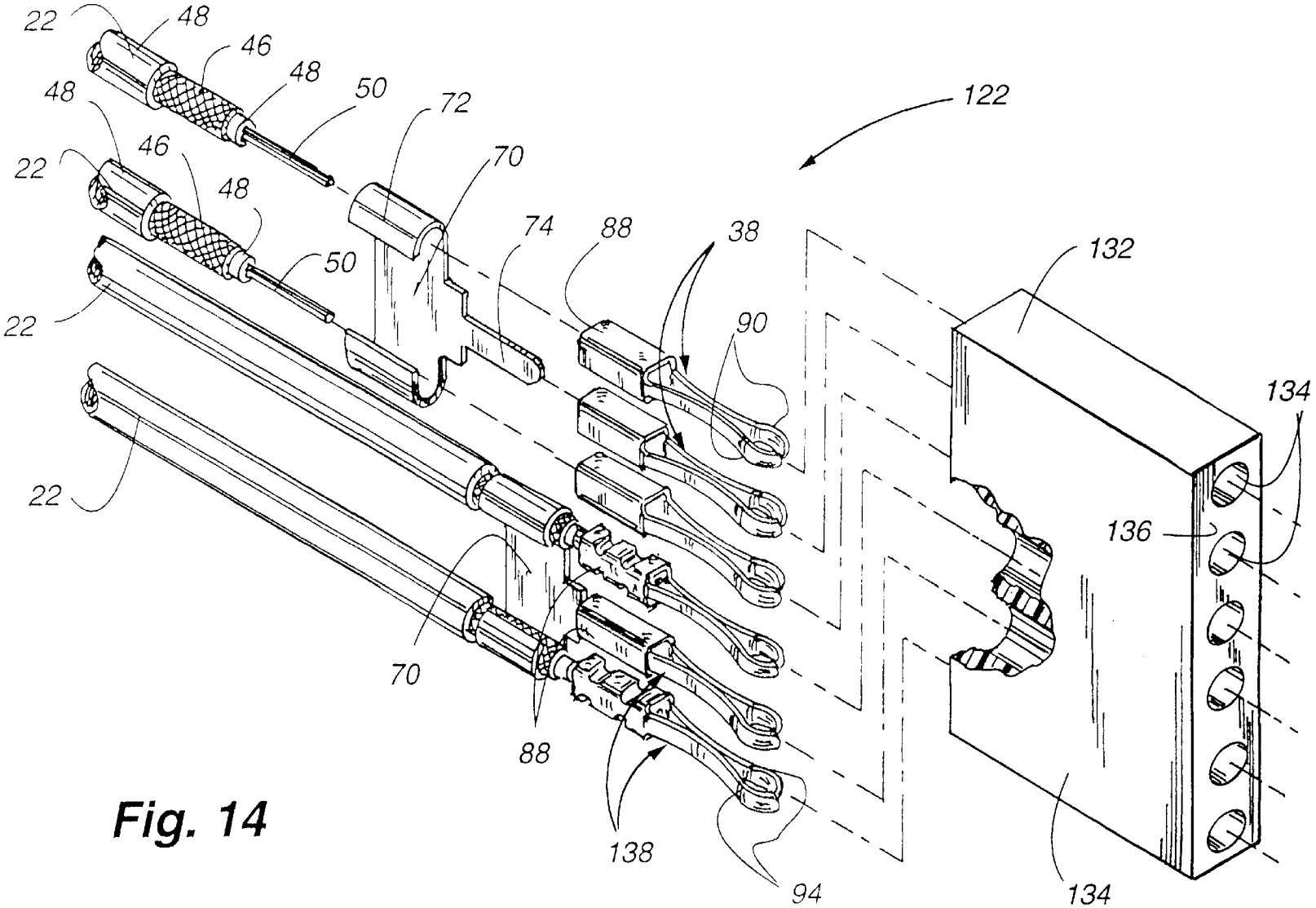
FIG. 14 is an enlarged, partial, perspective and exploded view of an insert retaining portion of the coaxial cable to coaxial cable connector shown in FIG. 13.

Details of the coax to coax connector 41 are shown in FIGS. 13 and 14. The coax to coax connector 41 includes a socket retaining portion 120 and an insert retaining portion 122. Many of the components employed in the socket retaining portion 120 and the insert retaining portion 122 are the same as or very similar to those employed in the coax to flex connector 34.

The socket retaining portion 120 of the coax to coax connector 41 includes a body 124 of electrically insulating material, as is shown in FIG. 13. A plurality of holes 126 are formed in the body 124 in a row. Multiple rows of holes 126 could also be formed in the connector body 124 if the size of the socket retaining portion 120 permits. Sockets 62 are inserted in the holes 126 until the ends 75 of the sockets 62 project beyond a mating surface 128 of the body 124 by a predetermined length. The sockets 62 are retained in the body 124 in the same manner previously described in conjunction with the coax attachment portion 42 of the coax to flex connector 34. The sockets 62 are also connected to the coaxial cables 22 and to the grounding clip 70 in the same manner described in conjunction with the coax attachment portion 42. Adhesive bonding material 130, such as epoxy, helps retain the coaxial cables 22, the grounding clips 70 and the sockets 62 to the body 124.

The insert retaining portion 122 includes a body 132 of electrically insulating material with a plurality of holes 134 formed therein in a row, as is shown in FIG. 14. Multiple rows of holes 134 may be formed in the connector body 132 if the size permits. The number of holes 134, the number of rows of holes 134, and the location of the holes 134 in the body 132 should correspond to those in the socket retaining portion 120 to allow the retaining portions to mate. A mating surface 136 of the body 132 contacts the mating surface 128 of the socket retention portion 120 (FIG. 13) when the portions 120 and 122 are connected together.

Inserts 138 are connected to the projection portion 74 of the grounding clips 70 and to the center conductors 50 of the coaxial cable 22, preferably by crimping an end of the socket 64 or by soldering. The outer cover 44, shielding conductor 46, inner insulation 48 and center conductor 50 are all stripped in a stepped configuration as shown to accommodate this connection. The end of the outer cover 44 preferably contacts or is closely adjacent to the wing portions 72 of the grounding clip 70 at the location where they are bent around the shielding conductor 46. After connecting the inserts 138, they are inserted into and retained in the holes 134 in the body 132. The inserts 138 are similar to those inserts 62 used in the flex connector portion 52 (FIG. 8) except that the S-shaped contact 96 is removed from the inserts 138. In addition, the body portion 88 of each insert 138 is crimped or otherwise connected to the center conductor 50 of the coaxial cables 22 and to the projection portion 74 of the grounding clip 70. The wing portions 72 of the grounding clip 70 are bent around and connected to the shielding conductors 46 of coaxial cables in the manner previously described. The inserts 138 are retained in the holes 134 by an adhesive or by a friction fit of the body portion 88 within the holes 134. Adhesive or epoxy material 140 (FIG. 13) helps retain the coaxial cables 22 to the body 132.

The socket retaining portion 120 mates with the insert retaining portion 122 of the coax to coax connector 41 in essentially the same manner that the attachment portions 52 and 42 of the coax to flex connector 34 mate together as shown in FIG. 5. That is, the fingers 90 fit within the interior of the sockets 64 to establish a good electrical connection.

Figure 15:
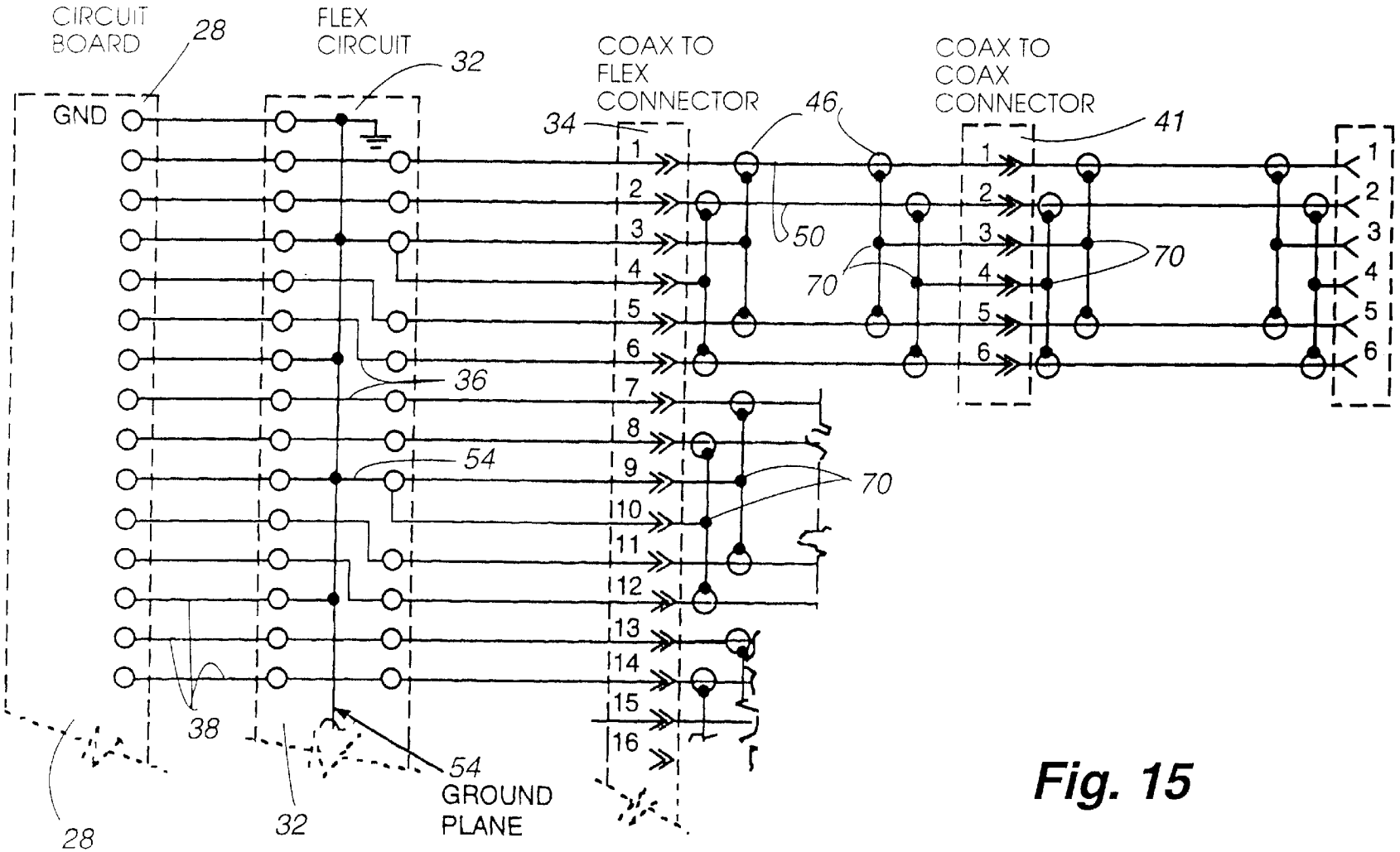
FIG. 15 is a schematic circuit diagram of the connection assembly shown in FIG. 2.

The components of the connection assembly 20 are shown in electrical schematic form in FIG. 15. The electrical connections and paths between the electronic circuit and the coaxial cables is illustrated for reference and comparison purposes with respect to the preceding description.

The connection assembly 20 establishes and maintains controlled impedance paths which are generally shielded from exterior radiated signals over substantially the entire length of the signal transmission through the assembly 20. In the coax to flex connector 34 and in the flex to flex connector 41, the relatively small region of the insert 62 and socket 64 selection of an appropriate plastic insulating material for the connector bodies and spacing of the socket and insert connections will achieve a specific path impedance. As a result, both superior signal communication bandwidth and high density electrical connections are achieved in relatively small spaces by the connection assembly 20.

A presently preferred embodiment of the invention has been described with a degree of particularity. This description is of a preferred example for implementing the invention. The scope of the invention should not necessarily be limited by this description, but is defined by the scope of the following claims.

The invention claimed:

[1. A connection assembly including a coaxial cable to microstrip flex circuit connector which interconnects a center conductor and a shielding conductor of a coaxial cable with a trace and a ground plane conductor of a microstrip flex circuit respectively, said coaxial cable to microstrip flex circuit connector comprising:

a coaxial cable attachment portion mechanically attached to a plurality of coaxial cables, the coaxial cable attachment portion including a plurality of first electrical connectors, each of which is separately electrically connected to the center conductor of the coaxial cable and a plurality of second electrical connectors, each of which is electrically connected to at least one shielding conductor of the plurality of coaxial cables;

a microstrip flex circuit attachment portion mechanically attached to a microstrip flex circuit having a plurality of traces, the microstrip flex circuit attachment portion including a plurality of third electrical connectors, each of which is separately electrically connected to a trace, and a plurality of fourth connectors, each of which is commonly connected to the ground plane conductor; and wherein:

the coaxial cable attachment portion and the microstrip flex circuit attachment portion mate with one another and when mated separately connect the first and third electrical connectors and the second and fourth electrical connectors.]

[2. A connection assembly as defined in claims 1 wherein:

the coaxial cable attachment portion includes a body which retains the first and second electrical connectors in a predetermined pattern;

the microstrip flex circuit attachment portion includes a body which retains the third and fourth electrical connectors in a predetermined pattern;

the predetermined pattern of the electrical connectors in the body of the coaxial attachment portion corresponds with the predetermined pattern of the electrical connectors in the body of the microstrip flex circuit attachment portion; and the predetermined patterns of electrical connectors in the bodies of the coaxial attachment portion and the microstrip flex circuit attachment portion allowing contact of the first electrical connectors with the third electrical connectors and allowing contact of the second electrical connectors with the fourth electrical connectors when the attachment portions mate together.]

[3. A connection assembly as defined in claim 2 wherein:

the first and third electrical connectors are each of a same first structure;

the second and fourth electrical connectors are each of a same second structure; and the first and second structures are adapted to connect with one another.]

[4. A connection assembly as defined in claim 3 wherein:

one of the first or second structure is an insert; and the other one of the first or second structure is a socket.]

[5. A connection assembly as defined in claim 2 wherein:

the center conductors of a first plurality of coaxial cables are each connected to on first electrical connector; and the shielding conductors of the first plurality of coaxial cables are commonly connected to a second electrical connector located in the predetermined pattern in adjacency with the first electrical connectors to which the center conductors of the first plurality of coaxial cables are connected.]

[6. A connection assembly as defined in claim 5 wherein said coaxial cable to microstrip flex circuit connector further comprises:

a grounding clip connected to the coaxial cable attachment portion and to the shielding conductors of the first plurality of coaxial cables, the grounding clip further including a projection portion connected to a second electrical connector.]

[7. A connection assembly as defined in claim 6 wherein:

the predetermined pattern of electrical connectors is at least one row in the each attachment portion;

the first plurality of coaxial cables is two coaxial cables;

the grounding clip further includes two wing portions, each wing portion extending to and connecting with one shielding conductor of each of the two coaxial cables of the first plurality; and the grounding clip further includes a projecting portion connecting to a second electrical connector.]

[8. A connection assembly as defined in claim 7 wherein:

the predetermined pattern of electrical connectors is at least one row in each attachment portion;

the first electrical connectors are located in the first and third positions a sequence of three electrical connectors in the row;

the second electrical connector is located in the second position in the sequence of the three electrical connectors in the row;

the grounding clip is generally T-shaped with the wing portions extending outward from the projecting portion of the grounding clip;

the wing portions of the grounding clip extend to and connect with the shielding conductors of the coaxial cables which have center conductors connected to the first electrical connectors in the first and third positions in the sequence of the three electrical connectors in the row; and the projecting portion of the grounding clip extends to and connects with the second electrical connector in the second position in the sequence of the three electrical connectors in the row.]

[9. A connection assembly as defined in claim 8 wherein:

the wing portions of the grounding clip are connected to the shielding conductors of the coaxial cables by bending the wing portions around a portion of the shielding connectors.]

[10. A connection assembly as defined in claim 9 wherein:

the first and second electrical connectors are each sockets;

the sockets are retained in holes formed in the predetermined pattern in the body of the coaxial cable attachment portion with each socket projecting from a mating surface of the body of the coaxial cable attachment portion; and the third and fourth electrical connectors are each an insert;

the inserts are positioned in holes in the body of the microstrip flex circuit attachment portion with each insert recessed from a mating surface of the body of the microstrip flex circuit attachment portion; and the inserts contact the sockets when the attachment portions connect with one another.]

[11. A connection assembly as defined in claim 2 wherein:

each of a first plurality of traces of the microstrip flex circuit is connected to a third electrical connector; and each of the fourth electrical connectors is commonly connected to the ground plane conductor of the microstrip flex circuit.]

[12. A connection assembly as defined in claim 11 wherein:

each of the third and fourth electrical connectors includes a contact end extending from the body of the microstrip flex circuit attachment portion; and the contact ends of the third electrical connectors contact traces of the microstrip flex circuit.]

[13. A connection assembly as defined in claim 12 wherein:

the microstrip flex circuit includes ground trace pads formed between traces, and electrical connections between the ground trace pads and the ground plane conductor; and the contact ends of the fourth electrical connectors contact and are connected to the ground trace pads of the microstrip flex circuit.]

[14. A connection assembly as defined in claim 13 wherein:

the ground trace pads are connected to the ground plane conductor by a plated through hole.]

[15. A connection assembly as defined in claim 12 wherein:

the microstrip flex circuit includes a layer of insulation adjacent to the ground plane conductor and exposed areas of the ground plane conductor surrounded by the insulation; and the contact ends of the fourth electrical connectors contact the exposed areas of the ground plane conductor of the microstrip flex circuit.]

[16. A connection assembly as defined in claim 12 wherein:

the predetermined pattern of electrical connectors is at least one row in the microstrip flex circuit attachment portion;

the third electrical connectors are located in the first and third positions in a sequence of three electrical connectors in the row;

a fourth electrical connector is located in the second position of the sequence of the three electrical connectors in the row;

two traces are located spaced apart on the microstrip flex circuit to connect the contact end of each third electrical connector to each of the two traces; and the contact end of each fourth electrical connector is connected to the ground plane conductor at a location between the two traces to which the contact ends of third electrical connectors are attached.]

[17. A connection assembly as defined in claim 16 wherein:

the predetermined pattern of electrical connectors is two parallel rows in the microstrip flex circuit attachment portion, the two rows are spaced transversely apart; and the microstrip flex circuit is positioned between the two rows with the contact ends of the third and fourth electrical connectors connected to the traces and ground plane conductor, respectively.]

[18. A connection assembly as defined in claim 17 wherein:

the microstrip flex circuit includes traces and ground trace pads on opposite sides of the ground plane conductor and separated from the ground plane conductor by a layer of insulation;

the third electrical connectors are located in the first and third positions of the sequence of the three electrical connectors in each of the two rows, each third electrical connector in one row is directly opposite of a third electrical connector in the other row:

a fourth electrical connector is located in the second position in the sequence of the three electrical connectors in each row, the fourth electrical connector of one row is directly opposite of the fourth electrical connector in the other row;

the distance between the retaining ends of the electrical conductors in the two rows is approximately equal to the distance between the traces and ground trace pads on opposite sides of the microstrip flex circuit; and the traces and ground trace pads on opposite sides of the ground plane conductor are connected to the contact ends of the third and fourth electrical connectors.]

[19. A connection assembly as defined in claim 18 wherein:

the first and second electrical connectors are each sockets;

the sockets are retained in holes formed in the predetermined pattern in the body of the coaxial cable attachment portion with each socket projecting from a mating surface of the body of the coaxial cable attachment portion; and the third and fourth electrical connectors are each an insert;

the inserts are positioned in holes in the body of the microstrip flex circuit attachment portion located in a predetermined position corresponding with the locations of the sockets, each insert is recessed from a mating surface of the body of the microstrip flex circuit attachment portion; and the inserts contact the sockets when the attachment portions connect with one another.]

[20. A connection assembly as defined in claim 17 wherein:

the microstrip flex circuit includes traces located on opposite sides of the ground plane conductor, a layer of insulation adjacent to the ground plane conductor and exposed areas of the ground plane conductor surrounded by the insulation;

the third electrical connectors are located in the first and third positions of the sequence of the three electrical connectors in each of the two rows, each third electrical connector in one row is directly opposite of a third electrical connector in the other row:

a fourth electrical connector is located in the second position in the sequence of the three electrical connectors in each row, the fourth electrical connector of one row is directly opposite of the fourth electrical connector in the other row; and the traces on opposite sides of the ground plane conductor and the exposed areas of the ground plane conductor are connected to the contact ends of the third and fourth electrical connectors.]

[21. A connection assembly as defined in claim 20 wherein:

the first and second electrical connectors are each sockets;

the sockets are retained in holes formed in the predetermined pattern in the body of the coaxial cable attachment portion with each socket projecting from a mating surface of the body of the coaxial cable attachment portion; and the third and fourth electrical connectors are each an insert;

the inserts are positioned in holes in the body of the microstrip flex circuit attachment portion located in a predetermined position corresponding with the locations of the sockets, each insert is recessed from a mating surface of the body of the microstrip flex circuit attachment portion; and the inserts contact the sockets when the attachment portions connect with one another.]

[22. A connection assembly including a microstrip flex circuit to electrical circuit connector which interconnects a plurality of traces and a ground plane conductor of the microstrip flex circuit to connection pads formed on the electrical circuit, and a coaxial cable to microstrip flex circuit connector which interconnects a center conductor and a shielding conductor of a coaxial cable with a trace and a ground plane conductor of a microstrip flex circuit respectively, said coaxial cable to microstrip flex circuit connector comprising:

a coaxial cable attachment portion mechanically attached to the coaxial cable, the coaxial cable attachment portion including a first electrical connector electrically connected to the center conductor of the coaxial cable and a second electrical connector electrically connected to the shielding conductor;

a microstrip flex circuit attachment portion mechanically attached to the microstrip flex circuit, the microstrip flex circuit attachment portion including a third electrical connector electrically connected to a trace and a fourth connector electrically connected to the ground plane conductor; wherein: the coaxial cable attachment portion and the microstrip flex circuit attachment portion mate with one another and when mated separately connect the first and third electrical connectors and the second and fourth electrical connectors; and said microstrip flex circuit to electrical circuit connector comprising:

a plurality of unsupported extensions of the traces and the ground plane conductor extending from the microstrip flex circuit; and an electrical surface to surface connection of the extensions to the connection pads on the electrical circuit.]

[23. A connection assembly as defined in claim 22 wherein:

the microstrip flex circuit includes traces located on opposite sides of the ground plane conductor, a layer of insulation adjacent to the ground plane conductor and exposed areas of the ground plane conductor surrounded by the insulation;

the electrical circuit includes a printed circuit board and the connection pads are located on a side of the printed circuit board; and at least one extension is bent from one side to the other side of the microstrip flex circuit to connect to a connection pad located adjacent to the other side of the microstrip flex circuit.]

[24. A connection assembly as defined in claim 23 wherein:

at least one extension from the ground plane conductor bent to connect to a connection pad on the printed circuit board.]

[25. A connection assembly as defined in claim 23 wherein said microstrip flex circuit to circuit board connection further includes a potting material connecting the microstrip flex circuit to the printed circuit board.]

*26. A coaxial cable grounding clip to connect an exposed shielding conductor of a first coaxial cable and an exposed shielding conductor of a second coaxial cable, comprising:*

*a first wing portion having a shape to contact the shielding conductor of the first coaxial cable and to retain a portion of the first coaxial cable to the first wing portion;*

*a second wing portion having a shape to contact the shielding conductor of the second coaxial cable and to retain a portion of the second coaxial cable to the second wing portion;*

*the first and second wing portions connecting together at a connection point;*

*a projection portion connected to the first and second wing portions at the connection point and extending longitudinally in parallel alignment with the portions of the first and second coaxial cables retained to the first and second wing portions, respectively;*

*the first and second wing portions extending transversely from the connection point, transversely relative to the projection portion and transversely relative to the portions of the first and second coaxial cables retained to the first and second wing portions, respectively; and*

*the first and second wing portions retaining the first and second coaxial cables in general parallel alignment with one another and with the projection portion at the portions of the first and second coaxial cables retained to the first and second wing portions, respectively.*

*27. A coaxial cable grounding clip as defined in claim 26, wherein each wing portion at least partially surrounds the exposed shielding conductor of the portion of each coaxial cable retained by each wing portion.*

*28. A coaxial cable grounding clip as defined in claim 27 wherein each coaxial cable has a cover of a predetermined thickness which is exterior to and which surrounds the shielding conductor, and wherein:*

*each wing portion which partially surrounds the exposed shielding conductor has a thickness that is generally the same as the thickness of the cover of the coaxial cable.*

*29. A coaxial cable grounding clip as defined in claim 28, wherein the wing portions and projection portion are each formed on a conductive metal.*

*30. A coaxial cable grounding clip as defined in claim 29 wherein the wing portions and projection portion are each formed of copper.*

*31. A coaxial cable grounding clip as defined in claim 27, wherein each coaxial cable has a cover of a predetermined thickness which is exterior to and which surrounds the shielding conductor, and wherein:*

*each wing portion which partially surrounds the exposed shielding conductor electrically connects to the exposed shielding conductor and has a thickness that is generally no greater than the thickness of the cover of the coaxial cable to consume substantially no greater space than does the cover at the retained portion of the coaxial cable.*

*32. A coaxial cable grounding clip as defined in claim 27, wherein:*

*the first and second wing portions retain the first and second coaxial cables in transversely spaced apart relationship with each other and with the projection portion; and*

*the projection portion and the first and second coaxial cables are generally located in a linear transversely spaced apart relationship.*

*33. A coaxial grounding clip as defined in claim 32, wherein each coaxial cable has a center conductor surrounded by the shielding conductor, and wherein the projection portion includes a distal end upon which a mating surface is located; and the mating surface of the distal end of the projection portion and the center conductors of the first and second coaxial cables are located in a linear transversely spaced apart relationship established by the position of the first and second coaxial cables retained by the wing portions.*

*34. A coaxial cable grounding clip as defined in claim 27, wherein the first and second wing portions form a common ground electrical connection of the first and second coaxial cables.*

*35. A method of connecting a shielding conductor of each of a plurality of coaxial cables to a common electrical reference with a grounding clip having a plurality of wing portions extending from a projection portion, each wing portion having a shaped segment to contact the shielding conductor and to retain a portion of one of the coaxial cables to the wing portion, the wing portions retaining the coaxial cables in generally parallel alignment with one another, the projection portion extending longitudinally in parallel alignment with the portions of the coaxial cables retained to the wing portions, said method comprising the steps of:*

*exposing a portion of the shielding conductor of each coaxial cable;*

*correlating each coaxial cable with one of the wing portions; and*

*for each correlated coaxial cable and wing portion:*

*contacting the exposed shielding conductor of the coaxial cables with the shaped segment of the wing portion; and*

*retaining the coaxial cable at the shaped segment; and*

*orienting all of the coaxial cables retained to the wing portions in generally parallel alignment with one another and with the projection portion.*

*36. A method as defined in claim 35 further comprising the step of:*

*retaining each coaxial cable to its correlated wing portion by frictional contact of the shielding conductor with the shaped segment.*

*37. A method as defined in claim 35, further comprising the step of:*

*at least partially surrounding each shielding conductor with the shaped segment of the correlated wing portion.*

*38. A method as defined in claim 35 wherein each coaxial cable has a cover of predetermined thickness which is exterior to and which surrounds the shielding conductor, said method further comprising the steps of:*

*removing a portion of the cover of each coaxial cable to create the exposed portion of the shielding conductor;*

*contacting each shaped segment with the exposed portion of the shielding conductor at a location adjacent to the cover of the correlated coaxial cable; and*

*confining each shaped segment to a space that was occupied by the cover of each correlated coaxial cable before the exposed portion was created.*

*39. A method as defined in claim 35 further comprising the step of:*

*orienting the projection portion and the plurality of coaxial cables connected to the grounding clip in a transversely spaced apart and substantially linear parallel alignment with one another.*

*40. A method as defined in claim 39, further comprising the step of:*

*connecting the projection portion into an electrical connector.*

*41. A method as defined in claim 40, wherein each coaxial cable has a center conductor surrounded by the shielding conductor, further comprising the step of:*

*connecting the center conductor of each coaxial cable into the electrical connector to which the projection portion is connected.*

*42. A grounding clip to connect to an exposed shielding conductor of a coaxial cable, comprising:*

*a wing portion having a shape to contact the shielding conductor and to retain a portion of the coaxial cable to the wing portion; and*

*a projection portion connected to the wing portion and extending longitudinally in parallel alignment with a portion of the coaxial cable retained to the wing portion;*

*the wing portion extending transversely relative to the projection portion and the portion of the coaxial cable retained to the wing portion from a connection point where the wing portion connects to the projection portion.*

*43. A grounding clip as defined in claim 42 wherein the projection portion includes a distal end upon which a mating surface is located.*

*44. A grounding clip as defined in claim 42, wherein:*

*the wing portion at least partially surrounds the exposed shielding conductor of the portion of the coaxial cable retained by the wing portion.*

*45. A grounding clip as defined in claim 44, wherein the coaxial cable has a cover of a predetermined thickness which is exterior to and which surrounds the shielding conductor, and wherein:*

*the wing portion which partially surrounds the exposed shielding conductor has a thickness that is generally the same as the thickness of the cover of the coaxial cable.*

* * * * *

UNITED STATES PATENT AND TRADEMARK OFFICE

CERTIFICATE OF CORRECTION

PATENT NO. : RE 37,368 E
APPLICATION NO. : 09/064536
DATED : September 18, 2001
INVENTOR(S) : Jon M. Huppenthal and Steven E. Garcia It is certified that error appears in the above-identified patent and that said Letters Patent is hereby corrected as shown below:

The information appearing in items (64) on the title page under the heading "Related U.S. Patent Documents" should read as follows:

Related U.S. Patent Documents

Division of:
(64) Patent No.: Re. 36,845
Issued: Aug. 29, 2000
Appl. No.: 08/910,716
Filed: Aug. 13, 1997
Which Is a Reissue of:
(64) Patent No.: 5,509,827
Issued: Apr. 23, 1996
Appl. No.: 08/342,850
Filed: Nov. 21, 1994

Signed and Sealed this

Twenty-third Day of October, 2007

JON W. DUDAS
*Director of the United States Patent and Trademark Office*